US012614824B2

(12) United States Patent (10) Patent No.: US 12,614,824 B2

Sakakibara (45) Date of Patent: Apr. 28, 2026

(54) METHOD FOR PRODUCING A SEALED BATTERY COMPRISING A LASER BEAM PROFILE

(71) Applicant: Prime Planet Energy & Solutions, Inc., Tokyo (JP)

(72) Inventor: Tetsuya Sakakibara, Kiyosu (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 383 days.

(21) Appl. No.: 17/897,219

(22) Filed: Aug. 29, 2022

(65) Prior Publication Data

US 2023/0105125 A1 Apr. 6, 2023

(30) Foreign Application Priority Data

Oct. 4, 2021 (JP) ................................. 2021-163434

(51) Int. Cl.
*H01M 50/636* (2021.01)
*H01M 10/058* (2010.01)

(52) U.S. Cl.
CPC ....... *H01M 50/636* (2021.01); *H01M 10/058* (2013.01)

(58) Field of Classification Search
CPC ........................... H01M 50/363; H01M 10/058
See application file for complete search history.

(56) References Cited

U.S. PATENT DOCUMENTS

| | | | |
|---|---|---|---|
| 2012/0189903 A1 | 7/2012 | Kawada et al. | |
| 2014/0020241 A1 | 1/2014 | Kawada et al. | |
| 2018/0369963 A1 | 12/2018 | Tsukui et al. | |
| 2021/0273282 A1* | 9/2021 | Kang | ................... H01M 50/15 |

FOREIGN PATENT DOCUMENTS

| | | |
|---|---|---|
| CN | 102623665 A | 8/2012 |
| CN | 205057298 U | 3/2016 |
| CN | 107331804 A | 11/2017 |
| CN | 107876979 A | 4/2018 |
| JP | 2000-021437 A | 1/2000 |
| JP | 2008-041548 A | 2/2008 |
| JP | 2012-155933 A | 8/2012 |

(Continued)

OTHER PUBLICATIONS

EPO machine generated English translation of KR 2006-0025940 A (Year: 2006).*

*Primary Examiner* — Kimberly Wyluda
(74) *Attorney, Agent, or Firm* — HAUPTMAN HAM, LLP

(57) ABSTRACT

A method for producing a sealed battery, capable of firmly joining a battery case and a sealing cover, includes injecting an electrolytic solution into the battery case through the liquid inlet, and after the injecting, welding the battery case and the sealing cover by irradiating and linearly scanning a laser beam on a welding area across the battery case and the sealing cover, while the liquid inlet is closed with the sealing cover. The laser beam has a beam profile including a first beam capable of vaporizing the electrolytic solution and oil, which exist on the surface of the welding area, and a second beam enabling keyhole welding on a removal portion of the welding area, from which at least part of the electrolytic solution and at least part of the oil have been removed by irradiation of the first beam.

12 Claims, 9 Drawing Sheets

(56)                References Cited

FOREIGN PATENT DOCUMENTS

| | | | |
|---|---|---|---|
| JP | 2014-175160 | A | 9/2014 |
| JP | 2015219962 | A | 12/2015 |
| JP | 2016-140877 | A | 8/2016 |
| JP | 2016143656 | A | 8/2016 |
| JP | 20195775 | A | 1/2019 |
| KR | 2006-0025940 | A * | 3/2006 |

* cited by examiner

FIG. 2

START

ASSEMBLING STEP — S1

LIQUID INJECTING STEP — S2

WELDING STEP — S3

END

LB

LB1

LB2

METHOD FOR PRODUCING A SEALED BATTERY COMPRISING A LASER BEAM PROFILE

CROSS-REFERENCE TO RELATED APPLICATIONS

This application is based upon and claims the benefit of priority to Japanese Patent Application No. 2021-163434 filed on Oct. 4, 2021, the entire contents of which are incorporated herein by reference.

BACKGROUND

Technical Field

The present disclosure relates to a method for producing a sealed battery.

Related Art

Japanese unexamined patent application publication No. 2016-143656 discloses a method for producing a sealed battery provided with a battery case having a liquid inlet and a sealing cover that seals the liquid inlet. Specifically, in a liquid injecting step, an electrolytic solution is injected into the battery case through the liquid inlet. Then, in a welding step, the battery case and the sealing cover are welded together by a laser beam irradiated and linearly scanned on an annular welding area across the battery case and the sealing cover, while the liquid inlet is closed with the sealing cover. In this welding, firstly, a part of the annular welding area in a circumferential direction, of the battery case and the sealing cover, is welded by keyhole welding, and then a remaining part of the welding area in the circumferential direction is welded by heat-conduction welding.

SUMMARY

Technical Problems

Meanwhile, the surface of the welding area of the battery case and the sealing cover is possibly stuck with oil (e.g., press oil) used during production of the battery case and the sealing cover, or the electrolytic solution injected into the battery case in the liquid injecting step. Even in such a situation, in the foregoing welding step, keyhole welding is first performed on the welding area. The keyhole welding is liable to generate voids (blowholes) due to the electrolytic solution and the oil. Thus, in the foregoing welding step, a number of voids may be generated in the welding area having undergone the keyhole welding. Furthermore, the heat-conduction welding could not achieve a sufficient penetration depth and thus a welded portion by the heat-conduction welding may have insufficient weld strength. Consequently, the foregoing production method could not firmly join the battery case and the sealing cover.

The present disclosure has been made to address the above problems and has a purpose to provide a method for producing a sealed battery in which a battery case and a sealing cover are firmly joined to each other.

Means of Solving the Problems

To achieve the above-mentioned purpose, one aspect of the present disclosure provides a method for producing a sealed battery including: a battery case having a liquid inlet;

and a sealing cover that seals the liquid inlet, wherein the method comprises: injecting an electrolytic solution into the battery case through the liquid inlet; and after the injecting, welding the battery case and the sealing cover by irradiating and linearly scanning a laser beam on a welding area across the battery case and the sealing cover, while the liquid inlet is closed with the sealing cover, and the laser beam has a beam profile including: a first beam capable of vaporizing the electrolytic solution and oil, which exist on a surface of the welding area; and a second beam enabling keyhole welding on a removal portion of the welding area, from which at least part of the electrolytic solution and at least part of the oil have been removed by irradiation of the first beam.

In the welding in the foregoing production method, using the laser beam that has a beam profile including the first beam capable of vaporizing electrolytic solution and oil (oil content) existing on the surface of the welding area across the battery case and the sealing cover, that is, the surfaces of a to-be-welded portion of the battery case and a to-be-welded portion of the sealing cover, and the second beam enabling keyhole welding on the removal portion of the welding area from which at least part of the electrolytic solution and at least part of the oil have been removed by irradiation of the first beam, the battery case and the sealing cover are laser-welded to each other.

Specifically, the first beam is linearly irradiated on the welding area, which corresponds to a laser irradiation target area, of the battery case and the sealing cover, thereby vaporizing the electrolytic solution and the oil from the surface of the welding area, and further the second beam is irradiated in a linear form on the removal portion of the welding area, from which at least part of the electrolytic solution and at least part of the oil have been removed (disappeared due to vaporization) by irradiation of the first beam, thereby welding the removal portion by keyhole welding. The terms "linearly", "linear form", and "linear" in the present disclosure are not limited to a straight-line form, but include curved and other various line forms. Since the battery case and the sealing cover are welded by the keyhole welding with the second beam irradiated on the welding area from which at least part of the electrolytic solution and at least part of the oil have been removed, it is possible to reduce the generation of voids due to the electrolytic solution and oil and further make welds with a large depth. This method can therefore firmly join the battery case and the sealing cover.

The first beam is a laser beam having a power density capable of vaporizing an electrolytic solution and oil (oil content). This first beam also includes a laser beam having a power density at which the welding mode on the welding area is heat-conduction welding, that is, which is lower than the power density at which the welding mode is keyhole welding.

Furthermore, in the foregoing method for producing a sealed battery, the beam profile of the laser beam may be configured such that the first beam surrounds the second beam.

In the welding in the above-described production method, a laser beam having a beam profile that the first beam surrounds the second beam is used as the laser beam to laser-weld the battery case and the sealing cover. Specifically, the laser beam used in this method has, for example, a beam profile including a central portion formed of the second beam, having a circular shape in plan view, i.e., on the welding area, and a ring portion formed of the first beam, having an annular shape in plan view and surrounding the central portion.

By irradiating and linearly scanning such a laser beam on the welding area of the battery case and the sealing cover, a part of the first beam, i.e., a part of the ring portion, can be applied to the welding area prior to the second beam, i.e., the central portion. Accordingly, the electrolytic solution and the oil can be removed from the surface of the welding area by linearly irradiating of the first beam (the ring portion) on the welding area and further the battery case and sealing cover can be welded together in keyhole welding by linearly irradiating of the second beam (the central portion) on the removal portion of the welding area, from which at least part of the electrolytic solution and at least part of the oil have been removed by irradiation of the first beam (the ring portion).

BRIEF DESCRIPTION OF THE DRAWINGS

FIG. 2 is an explanatory view of a liquid injecting step in the present embodiment;

DETAILED DESCRIPTION OF THE EXEMPLARY EMBODIMENTS

Embodiments

Figure 1:
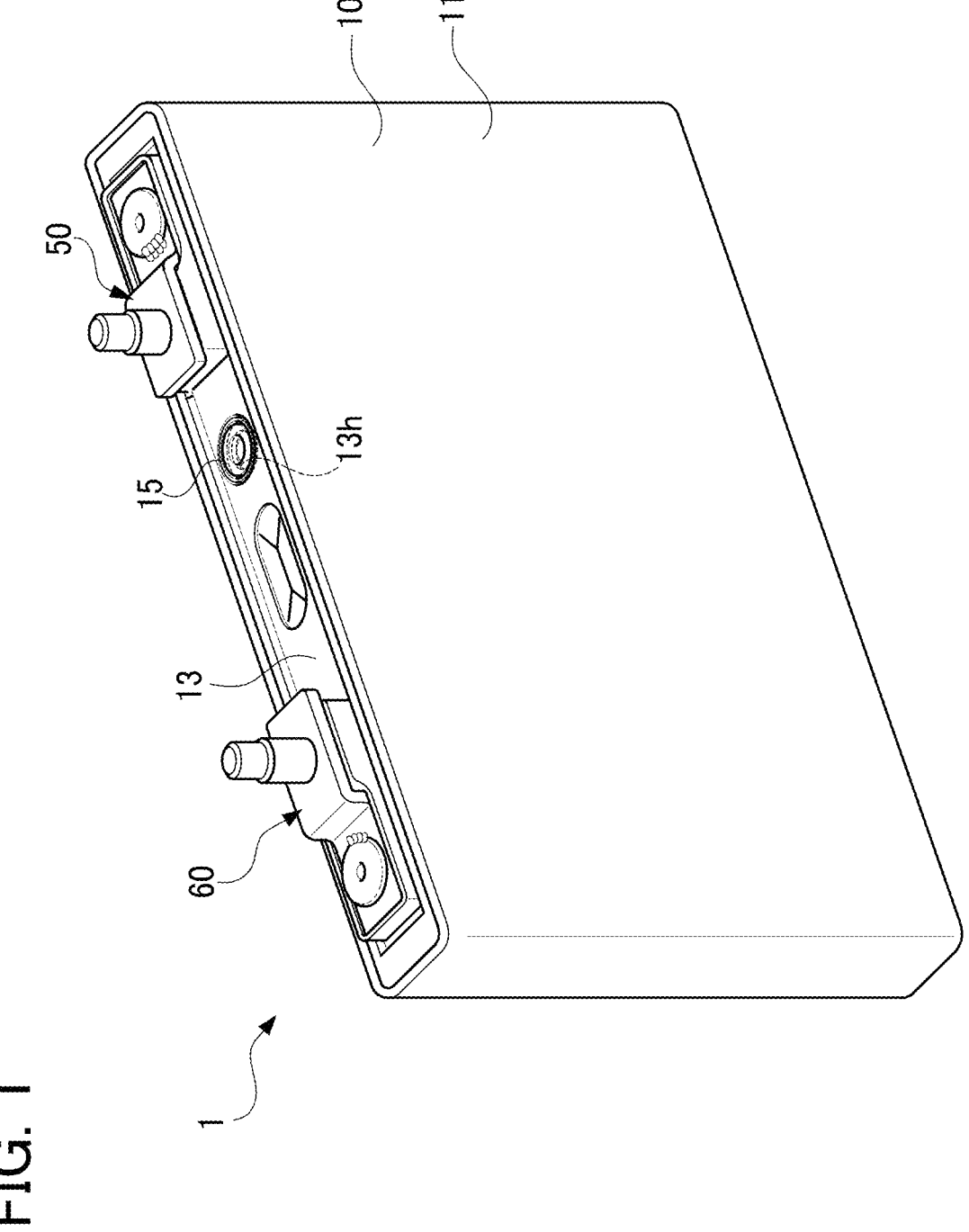
FIG. 1 is a perspective view of a sealed battery in an embodiment.
Figure 2:
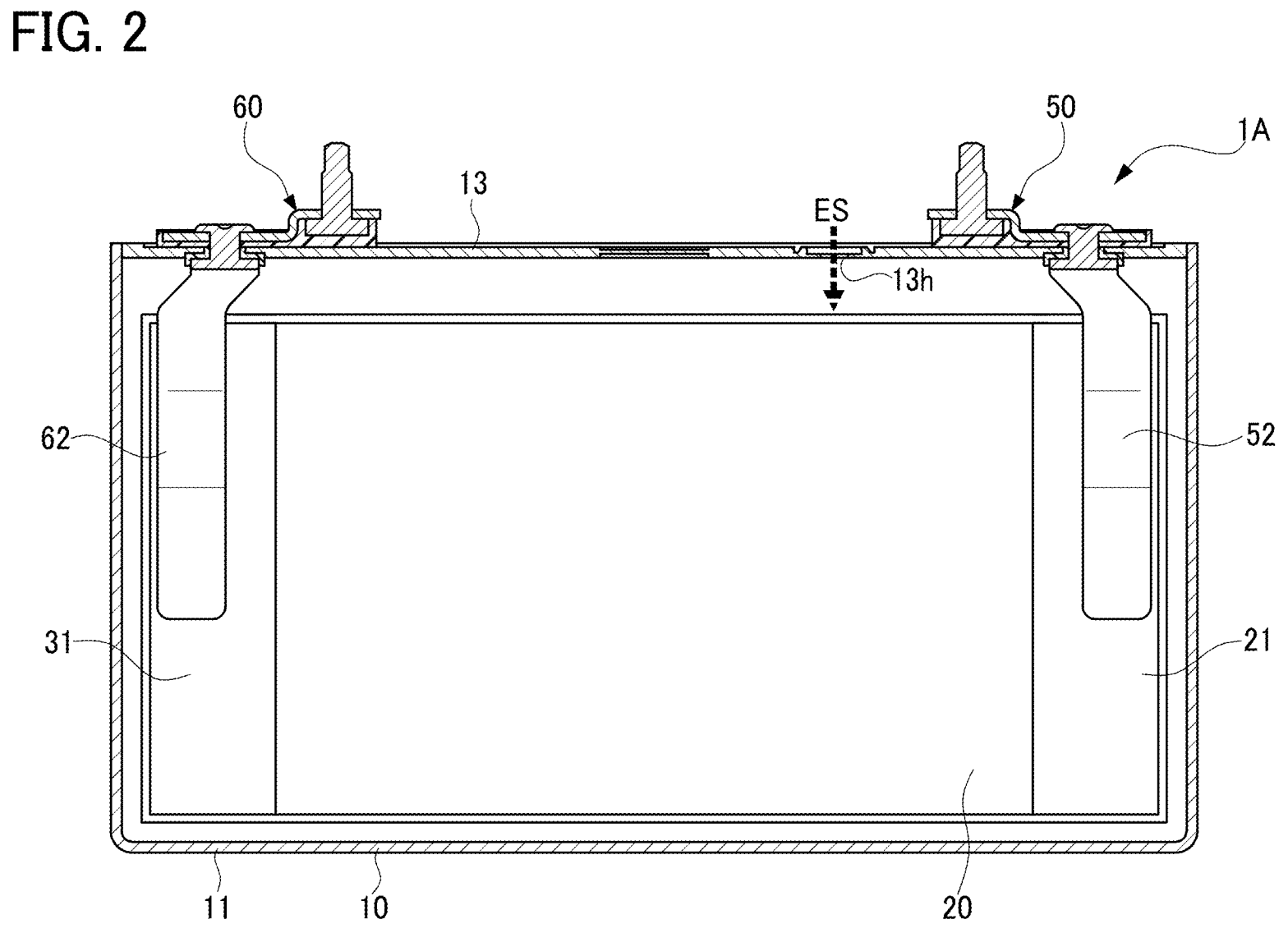

A detailed description of an embodiment of a method for producing a sealed battery of this disclosure will now be given referring to the accompanying drawings. The present embodiment shows an example for producing a lithium-ion secondary battery 1 as a sealed battery. FIG. 1 is a perspective view of the lithium-ion secondary battery 1 in the present embodiment. FIG. 2 is an explanatory view showing a liquid injecting step of a production process of the lithium-ion secondary battery 1, illustrating a cross-sectional view of an assembled unit 1A having been subjected to an assembling step of the production process of the lithium-ion secondary battery 1.

The lithium-ion secondary battery 1 is provided with a battery case 10, an electrode body 20 accommodated in the battery case 10, a positive terminal 50, and a negative terminal 60 (see FIG. 2). The battery case 10 is provided with a case body 11 having a rectangular box-like shape and a lid part 13 that closes the opening of the case body 11. The lid part 13 of the battery case 10 is formed with a liquid inlet 13*h*. To this lid part 13, a sealing cover 15 is welded to sealingly close the liquid inlet 13*h*. The electrode body 20 includes a positive electrode sheet 21 to which a connection part 52 of the positive terminal 50 is joined and a negative electrode sheet 31 to which a connection part 62 of the negative terminal 60 is joined.

Figure 3:
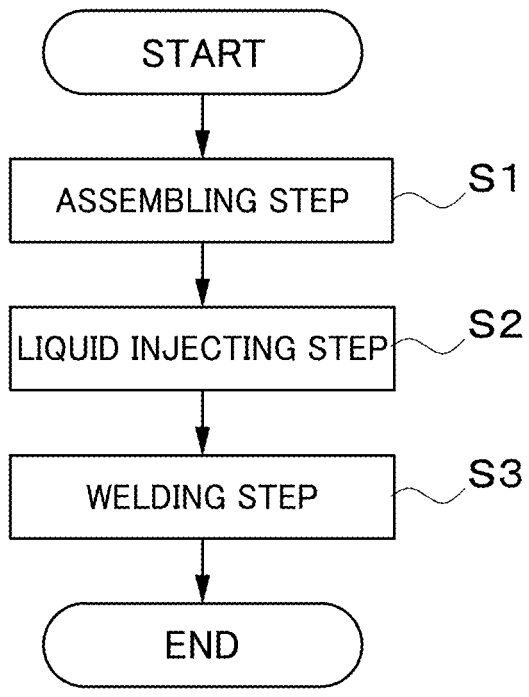
FIG. 3 is a flowchart showing a flow of a method for producing a sealed battery in the present embodiment.

The method for producing the lithium-ion secondary battery 1 will be described in detail below. FIG. 3 is a flowchart showing a flow of the production method of the lithium-ion secondary battery 1. In a step S1 (Assembling step), components and parts of the lithium-ion secondary battery 1 are first assembled to form the assembled unit 1A. Specifically, the positive electrode sheet 21, the negative electrode sheet 31, and separators (not shown) are wound together, making the electrode body 20 (see FIG. 2). The positive terminal 50 and the negative terminal 60 are attached to the lid part 13.

Subsequently, the connection part 52 of the positive terminal 50 is joined to the positive electrode sheet 21 of the electrode body 20. Further, the connection part 62 of the negative terminal 60 is joined to the negative electrode sheet 31 of the electrode body 20. Then, the electrode body 20 is put in the case body 11 and further the opening of the case body 11 is closed with the lid part 13. In this state, the lid part 13 and the case body 11 are welded together. Accordingly, the case body 11 and the lid part 13 joined to each other to form the battery case 10, resulting in the assembled unit 1A (see FIG. 2).

In a step S2 (Liquid injecting step), which is one example of the injecting in the present disclosure, an electrolytic solution ES is injected into the battery case 10 through the liquid inlet 13*h* of the lid part 13 of the assembled unit 1A, as shown in FIG. 2. The electrolytic solution ES in the present embodiment is a non-aqueous electrolytic solution containing an organic solvent (e.g., ethylene carbonate, ethyl methyl carbonate, and dimethyl carbonate) as a solvent and $LiPF_6$ as a solute. In step S3 (Welding step), corresponding to one example of the welding in the present disclosure, subsequently, the lid part 13 of the battery case 10 and the sealing cover 15 are welded together with the liquid inlet 13*h* closed with the sealing cover 15. The liquid inlet 13*h* is a cylindrical hole and the sealing cover 15 is a circular shape in plan view. In the present embodiment, the lid part 13 and the sealing cover 15 are made of aluminum.

Figure 8:
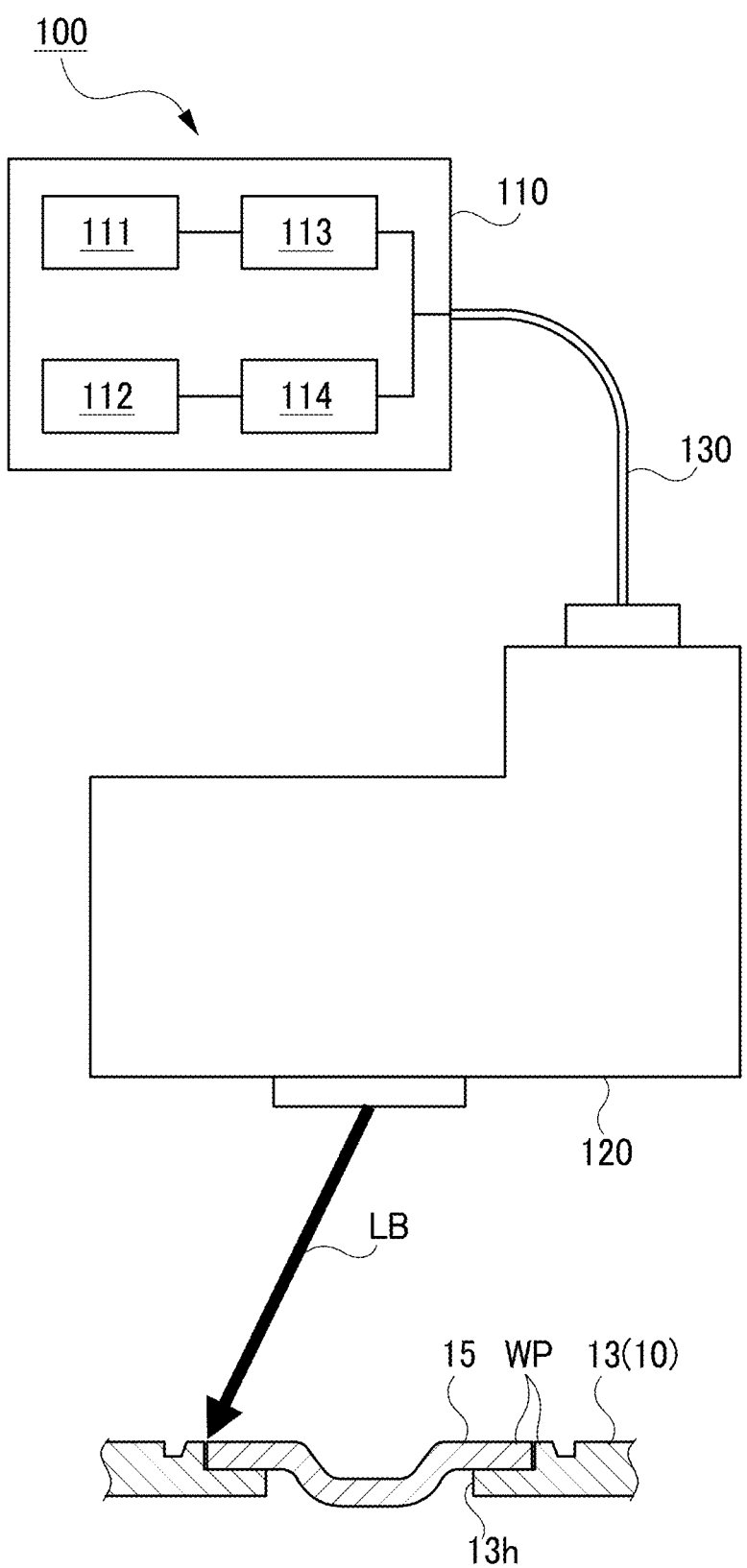
FIG. 8 is a schematic diagram of a laser welding device in the present embodiment.

Herein, the details of the welding step in the present embodiment will be described below. FIG. 8 is a schematic diagram of a laser welding device 100 used in the present embodiment. This laser welding device 100 is provided with a fiber laser oscillator 110 and a head unit 120. The fiber laser oscillator 110 and the head unit 120 are connected to each other through a fiber cable 130. The fiber laser oscillator 110 is provided with a first laser module 113 for generating a first beam LB1, a first power source 111 for supplying electric power to the first laser module 113, a second laser module 114 for generating a second beam LB2, and a second power source 112 for supplying electric power to the second laser module 114. This fiber laser oscillator 110 emits a laser beam LB formed of a combination of the first beam LB1 and the second beam LB2.

Figure 4:
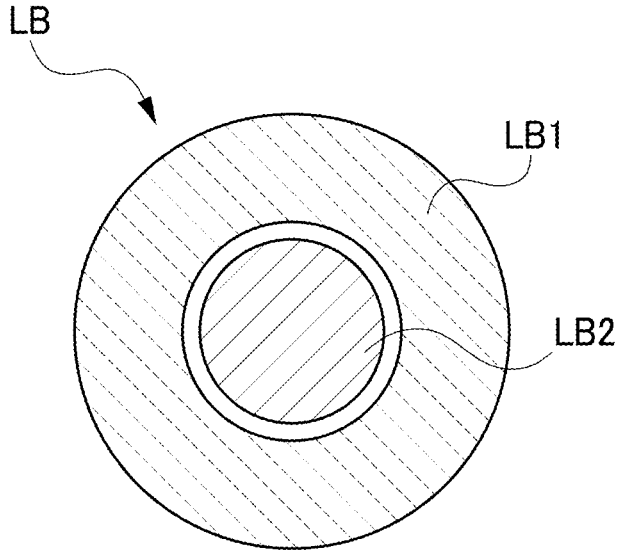
FIG. 4 is a diagram showing a beam profile of a laser beam in the present embodiment.

Specifically, the fiber laser oscillator 110 generates a laser beam LB having a profile that the first beam LB1 surrounds the second beam LB2, as shown in FIG. 4, and transmits this laser beam LB to the head unit 120. To be more specific, the laser beam LB has a beam profile including a central portion having a circular shape in plan view, formed of the second beam LB2, and a ring portion having an annular shape in plan view surrounding the central portion, formed of the first beam LB2 (see FIG. 4). In the present embodiment, the fiber laser oscillator 110 is HighLighit FL4000CSM-ARM produced by Coherent Inc.

The head unit 120 is a well-known head unit (an optical head) and configured to linearly scan and irradiate a laser beam LB emitted from the fiber laser oscillator 110 on a welding area WP, of the lid part 13 of the battery case 10 and the sealing cover 15, to weld the lid part 13 of the battery case 10 and the sealing cover 15. The welding area WP is annular in plan view, including a to-be-welded portion of the lid part 13 and a to-be-welded portion of the sealing cover 15. In the present embodiment, therefore, the lid part 13 of the battery case 10 and the sealing cover 15 are welded in an annular form over their entire circumference by the laser beam LB.

Meanwhile, the surface of the welding area WP across the lid part 13 and the sealing cover 15 may be possibly stuck with oil (e.g., press oil) used during production of the lid part 13 and the sealing cover 15 or the electrolytic solution ES injected into the battery case 10 in the liquid injecting step.

For this purpose, the first beam LB1 of the laser beam LB in the present embodiment has a power density (W/mm$^2$) capable of vaporizing the electrolytic solution ES and oil (oil content) existing on the surface of the welding area WP. The second beam LB2 has a power density (W/mm$^2$) enabling keyhole welding as the welding mode on the welding area WP. In the present embodiment, the power density of the first beam LB1 is set at the power density at which heat-conduction welding occurs as the welding mode on the welding area WP, which is lower than the power density enabling keyhole welding. In detail, the laser beam LB has a beam profile that includes the first beam LB1 that can vaporize the electrolytic solution ES and oil existing on the surface of the welding area WP, and the second beam LB2 that enables the keyhole welding on a removal portion CP of the welding area WP, from which at least part of the electrolytic solution ES and at least part of the oil have been removed by irradiation of the first beam LB1.

In the welding step in the present embodiment, consequently, using the laser beam LB having a beam profile including the first beam LB1 capable of vaporizing the electrolytic solution ES and oil (oil content) existing on the surface of the welding area WP across the lid part 13 of the battery case 10 and the sealing cover 15 and the second beam LB2 enabling the keyhole welding on the removal portion CP of the welding area WP, from which at least part of the electrolytic solution ES and at least part of the oil have been removed by irradiation of the first beam LB1, the lid part 13 of the battery case 10 and the sealing cover 15 are welded to each other (see FIGS. 5 to 9).

Figure 5:
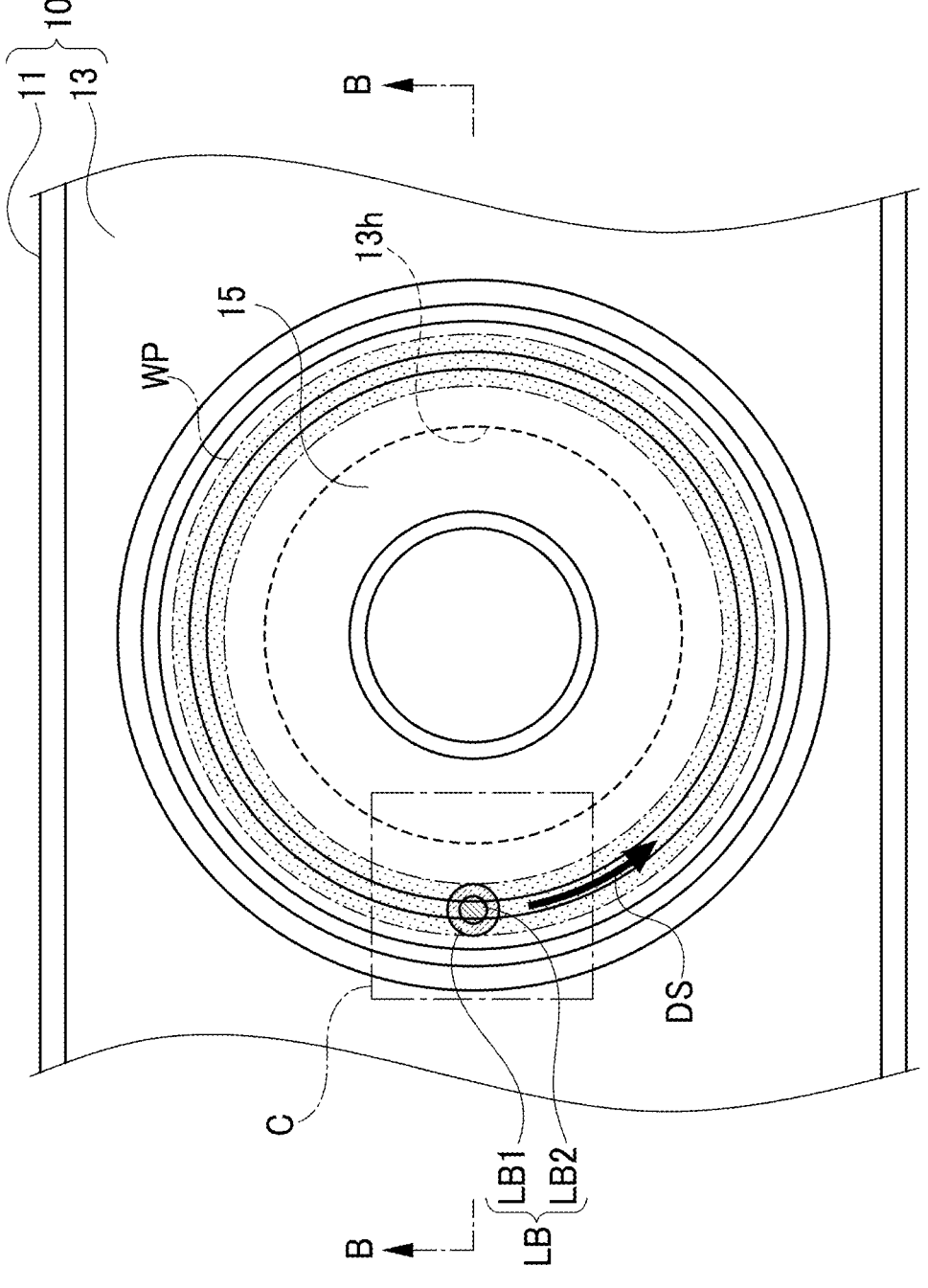
FIG. 5 is an explanatory diagram of a welding step in the present embodiment.
Figure 6:
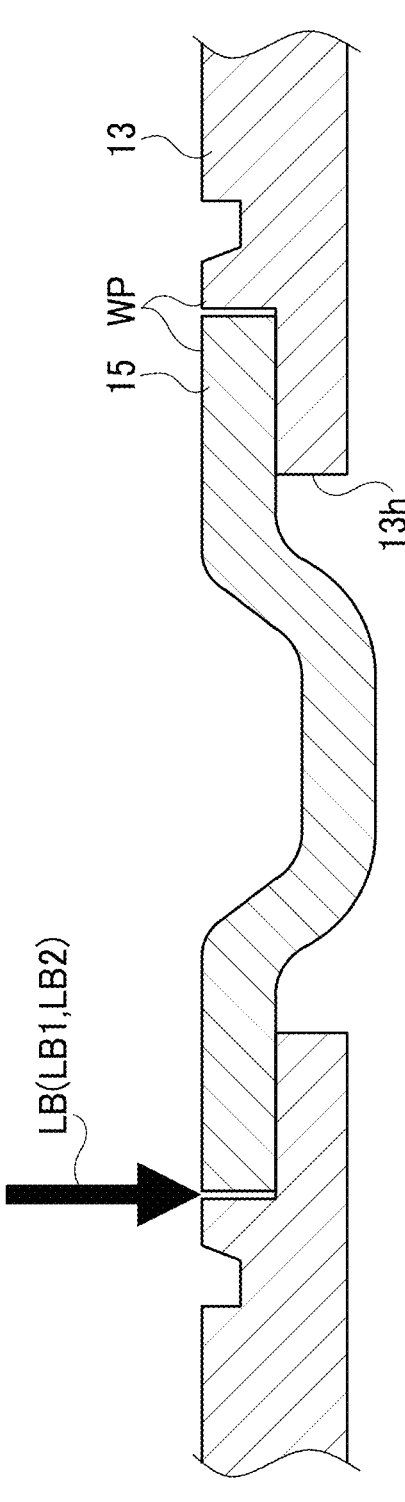
FIG. 6 is a cross-sectional diagram taken along a line B-B in FIG. 5.
Figure 9:
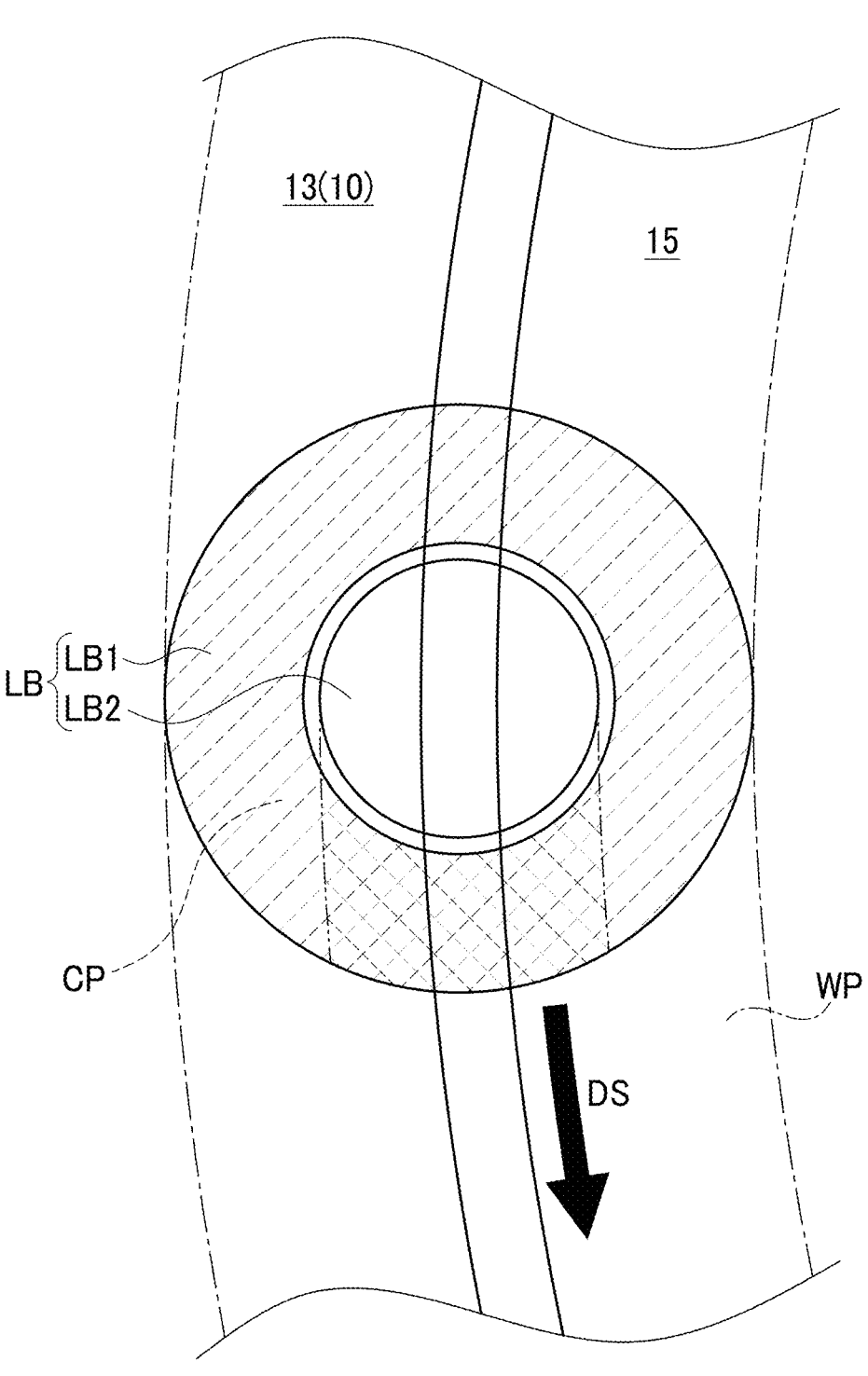
FIG. 9 is an enlarged view of a section C in FIG. 5.

Specifically, the first beam LB1 is irradiated linearly on the welding area WP, which corresponds to a laser irradiation target area, having an annular shape in plan view, causing the electrolytic solution ES and the oil (oil content) existing on the surface of the welding area WP to vaporize. The second beam LB2 is also irradiated linearly on at least a part of the removal portion CP of the welding area WP, from which at least part of the electrolytic solution ES and at least part of the oil have been removed (disappeared by vaporization) by irradiation of the first beam LB1, enabling the keyhole welding to occur on at least part of the removal portion CP. FIG. 9 is an enlarged view of a section C in FIG. 5, showing a plan view of a beam profile of the laser beam LB irradiated on the welding area WP, including a to-be-welded portion of the battery case 13 and a to-be-welded portion of the sealing cover 15, in which the removal portion CP by the laser beam LB is indicated with broken hatched lines. In FIG. 9, further, the scanning direction of the laser beam LB, i.e., the first beam LB1 and the second beam LB2, is indicated with an arrow DS.

Specifically, as described above, the laser beam LB has a beam profile that the first beam LB1 surrounds the second beam LB2. To be specific, the beam profile of the laser beam LB includes the central portion, which is formed of the second beam LB2 and circular in plan view, and the ring portion, which is formed of the first beam LB1 and annular in plan view surrounding the central portion (see FIG. 4). When this laser beam LB is irradiated and scanned linearly on the welding area WP, a part of the first beam LB1 (the ring portion) can be irradiated on the welding area WP prior to the second beam LB2 (the central portion). Refer to FIGS. 5 and 9.

Accordingly, it is possible to remove the electrolytic solution ES and oil from the surface of the welding area WP by linear irradiation of the first beam LB1 (the ring portion) on the welding area WP and also enable keyhole welding to occur on the lid part 13 of the battery case 10 and the sealing cover 15 by linear irradiation of the second beam LB2 (the central portion) on a part of the removal portion CP of the welding area WP, from which at least part of the electrolytic solution ES and at least part of the oil have been removed by irradiation of the first beam LB1 (the ring portion). The part of the removal portion CP is concretely a portion located ahead in the scanning direction DS relative to a portion under irradiation of the second beam LB2, for example, a portion indicated with cross-hatched lines in the removal portion CP by the laser beam LB in FIG. 9.

In the above manner, in which the second beam LB2 is irradiated on the welding area WP from which at least part of the electrolytic solution ES and at least part of the oil have been removed to weld the lid part 13 of the battery case 10 and the sealing cover 15 by keyhole welding as described above, it is possible to reduce the generation of voids due to the electrolytic solution ES and oil, that is, voids formed by gas generated by the electrolytic solution ES or oil due to welding heat, and also achieve welding with a deep welding depth. Therefore, the lid part 13 of the battery case 10 and the sealing cover 15 can be firmly joined to each other.

Figure 7:
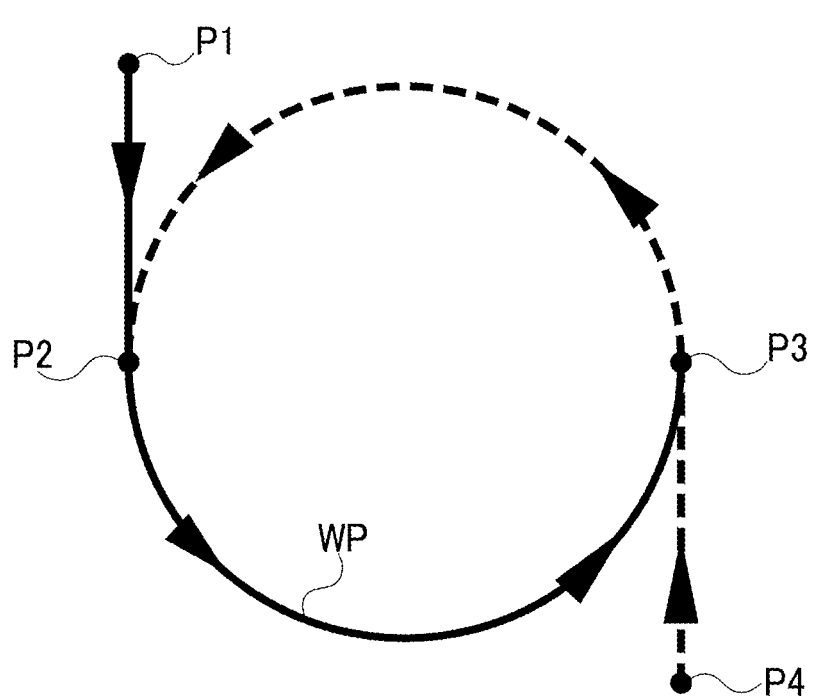
FIG. 7 is another explanatory diagram of a welding step in the present embodiment.

FIG. 7 is an explanatory diagram of a scan path of a laser beam LB in the welding step in the present embodiment. In this embodiment, as indicated with a solid line in FIG. 7, irradiation of the laser beam LB is started from a first position P1 located outside the welding area WP having an annular shape in plan view and the laser beam LB is scanned linearly, i.e., in a straight-line form, until reaching a second position P2 included in the welding area WP. Further, the laser beam LB is scanned linearly, i.e., in a curved (concretely, circular-arc) line form, over a half circumference of the welding area WP from the second position P2 to a third position P3 on the welding area WP, and then the irradiation of the laser beam LB is temporarily stopped. The terms "linearly", "linear form", and "linear" are not limited to the straight-line form and the curved line form, but include curved and other various line forms.

Subsequently, as indicated with a broken line in FIG. 7, the irradiation of the laser beam LB is started from a fourth position P4 located outside the welding area WP and the laser beam LB is caused to scan linearly, i.e., in a straight-line form, until reaching the third position P3 of the welding area WP. The laser beam LB is then caused to scan linearly, i.e., in a circular-arc line form over another half circumference of the welding area WP from the third position P3 to the second position P2 of the welding area WP, and then the welding step is terminated. When the laser beam LB is irradiated in the above scan path, it is possible to irradiate a part of the first beam LB1 (the ring portion) prior to the second beam LB2 (the central portion) over the entire circumference of the welding area WP (see FIGS. 5 and 9). Thus, the lid part 13 of the battery case 10 and the sealing cover 15 are welded to each other over their entire circumference.

In the present embodiment, the power density (W/mm²) of the first beam LB1 is set to a power density at which the welding mode on the welding area WP is heat-conduction welding, e.g., to a value within a range from 3574 to 25015 W/mm². Further, the power density (W/mm²) of the second beam LB2 is set to a power density at which the welding mode on the welding area WP is keyhole welding, e.g., to a value equal to or higher than 26802 W/mm². The fiber laser oscillator 110 in the present embodiment can independently adjust or change the value of the power density of the first beam LB1 and the power density of the second beam LB2 within each predetermined range. In the welding step in the present embodiment, therefore, the second beam LB2 (with the power density for keyhole welding) is irradiated on the welding area WP having been melted by the first beam LB1 to weld the welding area WP by keyhole welding. In this way, the welding can be performed with a large penetration depth, so that the lid part 13 of the battery case 10 and the sealing cover 15 can be firmly joined to each other.

<Electrolytic-Solution Removal Test Using a Laser Beam>

An electrolytic-solution removal test using irradiation of a laser beam will be described below. An aluminum flat plate is prepared first, and one surface of this plate is applied with an electrolytic solution ES, which will be hereinafter also referred to as an electrolytic-solution-applied surface. Then, prior to irradiation of the laser beam, the one surface of the flat plate applied with the electrolytic solution ES, namely, the electrolytic-solution-applied surface, is subjected to a quantitative analysis using an energy dispersive X-ray spectrometer (EDS) to measure the percentage of phosphorus (P) component (wt %). The phosphorus (P) is a component contained in the electrolytic solution ES. This measurement value is plotted as a line Ref in FIG. 10. Furthermore, using the laser welding device 100 in which the power density of the second beam LB2 (the central portion) is set to 0 and the power density of the first beam LB1 (the ring portion) is set to various values, the first beam LB1 is irradiated and linearly scanned on the electrolytic-solution-applied surface.

Figure 10:
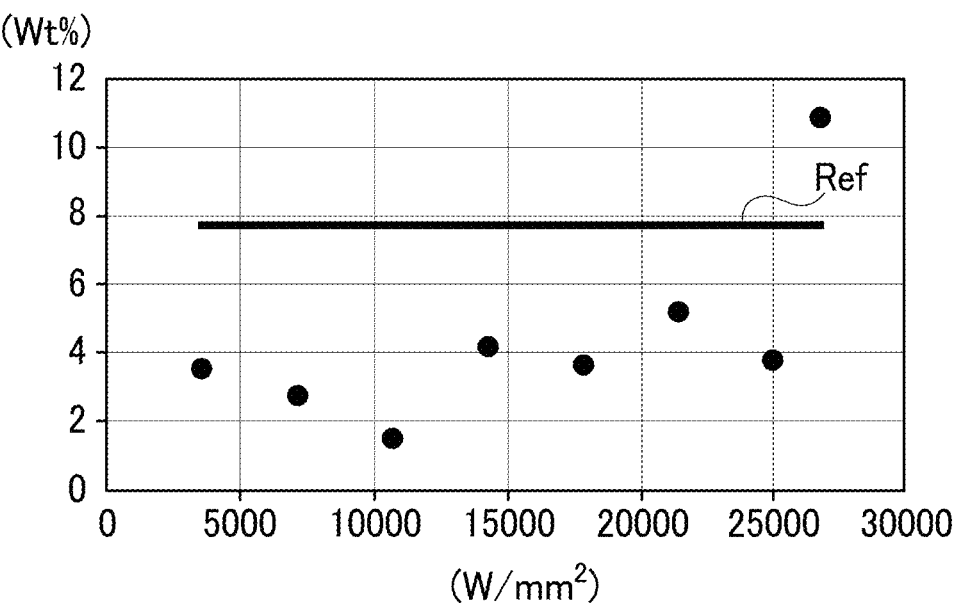
FIG. 10 is a graph showing results of an electrolytic-solution removal test using a laser beam.

In this test, concretely, the power density (W/mm²) of the first beam LB1 is set to eight different values: 3574, 7147, 10721, 14294, 17868, 21442, 25015, and 26802. Out of these values, 26802 (W/mm²) is the power density at which keyhole welding occurs as the welding mode on the welding area WP, and other values are the power densities at which heat-conduction welding occurs as the welding mode on the welding area WP. Then, the surface irradiated with the first beam LB1 at the above different power densities is subjected to the quantitative analysis using the EDS to measure the percentage (wt %) of P component in each surface. This result is shown in FIG. 10. When a measurement value (wt %) of the P component, which is contained in the electrolytic solution ES, is smaller than the line Ref, this result reveals that the first beam LB1 could remove, or vaporize, at least part of the electrolytic solution ES.

As shown in FIG. 10, when the power density of the first beam LB1 is set to a value within the range from 3574 to 25015 (W/mm²) at which the welding mode on the welding area WP is heat-conduction welding, the measurement value (wt %) of P component is smaller than the line Ref. In contrast, when the power density of the first beam LB1 is set to 26802 (W/mm²) at which the welding mode on the welding area WP is keyhole welding, the measurement value (wt %) of P component is larger than the line Ref. This result reveals that the first beam LB1 with the power density set within from 3574 to 25015 (W/mm²) is a first beam capable of vaporizing the electrolytic solution ES existing on the surface of the welding area WP. Further, the above result also reveals that the first beam LB1 with the power density at which the welding mode on the welding area WP is heat-conduction welding is a first beam capable of vaporizing the electrolytic solution ES existing on the surface of the welding area WP.

Furthermore, of the flat plates applied with the electrolytic solution ES, the portions irradiated by the first beams LB1 with the different power densities are imaged by a CT to capture cross-sectional images, and the number of voids in the imaged portions was investigated. In this test, a hollow or hole having a diameter of 0.05 mm or more is considered as a void, and the number of voids is counted. This result is shown in Table 1, under a column header "The number of voids on electrolytic-solution applied portion".

TABLE 1

| Power Density (W/mm²) | The number of voids on electrolytic-solution applied portion | The number of voids on oil applied portion | Welding mode |
|---|---|---|---|
| 3574 | 0 | 0 | Heat Conduction |
| 7147 | 0 | 0 | Heat Conduction |
| 10721 | 0 | 0 | Heat Conduction |
| 14294 | 0 | 0 | Heat Conduction |
| 17868 | 0 | 0 | Heat Conduction |
| 21442 | 0 | 0 | Heat Conduction |
| 25015 | 0 | 0 | Heat Conduction |
| 26802 | 162 | 40 | Keyhole |

As shown in Table 1, no void has been generated in the portions of the welding area WP irradiated by the first laser beam LB1 having the power density for the heat-conduction welding mode. In contrast, a number of voids have been generated in the portions of the welding area WP irradiated by the first laser beam LB1 having the power density for the keyhole welding mode. From these results, if the laser beam (the second beam LB2) with the power density for the keyhole welding mode is irradiated on the welding area WP on the surface of which the electrolytic solution ES exists, without irradiating the laser beam (the first beam LB1) that can vaporize the electrolytic solution ES present on the surface of the welding area WP, a number of voids, namely, blowholes, may conceivably occur in the welding area.

<Oil Removal Test Using a Laser Beam>

Next, an oil removal test using irradiation of a laser beam will be described below. As in the electrolytic-solution removal test described above, an aluminum flat plate is prepared first, and one surface of this plate is applied with press oil, which will be hereinafter also referred to as an oil-applied surface. Then, prior to irradiation of the laser beam, the one surface of the flat plate applied with the press oil, namely, the oil-applied surface, is subjected to the quantitative analysis using the energy dispersive X-ray spectrometer (EDS) to measure the percentage of carbon (C) component (wt %). The carbon (C) is a component contained in the press oil. This measurement value is plotted as a line Ref in FIG. 11. Furthermore, using the laser welding device 100 in which the power density of the second beam LB2 (the central portion) is set to 0 and the power density of the first beam LB1 (the ring portion) is set to various values, the first beam LB1 is irradiated and linearly scanned on the oil-applied surface.

Figure 11:
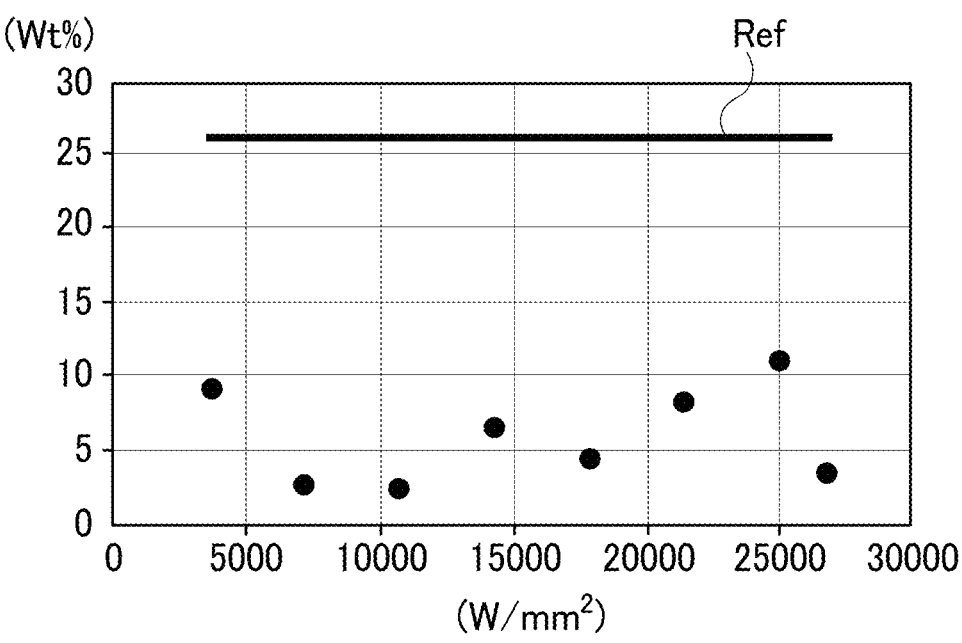
FIG. 11 is a graph showing results of an oil removal test using a laser beam.

In this test, the power density (W/mm²) of the first beam LB1 is also set to eight different values: 3574, 7147, 10721, 14294, 17868, 21442, 25015, and 26802. Then, the surfaces irradiated with the first beam LB1 at the above different power densities are subjected to the quantitative analysis using the EDS to measure the percentage (wt %) of C component in each surface. This result is shown in FIG. 11. When a measurement value (wt %) of C component, which is contained in the press oil, is smaller than the line Ref, this result reveals that the first beam LB1 could remove, or vaporize, at least part of the press oil.

As shown in FIG. 11, in this test, no matter when the power density of the first beam LB1 is set to any value within the range from 3574 to 25015 (W/mm²), the measurement value (wt %) of C component is smaller than the line Ref. This result reveals that at least part of the press oil could be removed. From the results of the present test and the foregoing electrolytic-solution removal test, the first beam LB1 with the power density within the range from 3574 to 25015 (W/mm²) can be said to be a first beam that can vaporize the electrolytic solution ES and the oil, which exist on the surface of the welding area WP. Moreover, the first beam LB1 with the power density at which heat-conduction welding occurs as the welding mode on the welding area WP can be said to be a first beam capable of vaporizing the electrolytic solution ES and the oil existing on the surface of the welding area WP.

Furthermore, of the flat plates applied with the press oil, the portions irradiated by the first beams LB1 with the different power densities are imaged by a CT to capture cross-sectional images, and the number of voids in the imaged portions was investigated. In this test, a hollow or hole having a diameter of 0.05 mm or more is considered as a void, and the number of voids is counted. This result is also shown in Table 1, under a column header "The number of voids on oil applied portion".

As shown in Table 1, no void has been generated in the portions of the welding area WP irradiated by the first beam LB1 having the power density for the the heat-conduction welding mode. In contrast, a number of voids have been generated in the portions of the welding area WP irradiated by the first laser beam LB1 having the power density for the keyhole welding mode. From these results of the present test and the foregoing electrolytic-solution removal test, if the the laser beam (the second beam LB2) with the power density for the keyhole welding mode is irradiated on the welding area WP on the surface of which the electrolytic solution ES or the oil exists, without irradiating the laser beam (the first beam LB1) capable of vaporizing the electrolytic solution ES and the oil present on the surface of the welding area WP, a number of voids, namely, blowholes, may conceivably occur in the welding area.

The foregoing embodiment shows mere examples and gives no limitation to the present disclosure. The present disclosure may be embodied in other specific forms without departing from the essential characteristics thereof. For instance, in the foregoing embodiment, the laser beam LB has a beam profile that the first beam LB1 surrounds the second beam LB2. As an alternative, the beam profile may be any beam profile as long as it includes a first beam LB1 capable of vaporizing an electrolytic solution ES and oil existing on the surface of a welding area WP and a second beam LB2 enabling keyhole welding on a removal portion CP of the welding area WP, from which at least part of the electrolytic solution ES and part of the oil have been removed by irradiation of the first beam LB1.

REFERENCE SIGNS LIST

1 Lithium-ion secondary battery (Sealed battery)
10 Battery case
13 Lid part
13h Liquid inlet
15 Sealing cover
100 Laser welding device
110 Fiber laser oscillator
120 Head unit
CP Removal portion
DS Scanning direction
ES Electrolytic solution
LB Laser beam
LB1 First beam
LB2 Second beam
WP Welding area

What is claimed is:
1. A method for producing a sealed battery including: a battery case having a liquid inlet; and a sealing cover that seals the liquid inlet,
    wherein
    the method comprises:
        injecting an electrolytic solution into the battery case through the liquid inlet; and
        after the injecting, welding the battery case and the sealing cover by irradiating and linearly scanning a laser beam on a welding area across the battery case and the sealing cover, while the liquid inlet is closed with the sealing cover,
    the laser beam has a beam profile including:
        a first beam capable of vaporizing the electrolytic solution and oil, which exist on a surface of the welding area; and
        a second beam enabling keyhole welding on a removal portion of the welding area, from which at least part of the electrolytic solution and at least part of the oil have been removed by irradiation of the first beam,
    the beam profile of the laser beam is configured such that the first beam surrounds the second beam, and
    the welding includes:
        before irradiating and linearly scanning the laser beam on the welding area where the battery case and the sealing cover are to be welded together, starting irradiating the laser beam from a first position located outside the welding area and linearly scanning the laser beam to a second position included in the welding area to cause, when the laser beam reaches the second position and upon the first beam being irradiated at the second position, the second beam to be irradiated at the second position,
        linearly scanning the laser beam from the second position, over a half circumference of the welding area, to a third position located in the welding area;
        temporarily stopping irradiation of the laser beam at the third position; and
        resuming irradiating the laser beam at a fourth position located outside the welding area and linearly scanning the laser beam from the fourth position to the third position included in the welding area.
2. The method according to claim 1, wherein
    the beam profile includes a central portion formed of the second beam on the welding area, and a ring portion formed of the first beam surrounding the central portion.

3. The method according to claim 1, wherein the laser beam is linearly scanned in a straight-line form from the first position to the second position.

4. The method according to claim 1, wherein the welding area has an annular shape in plan view, and before irradiating and linearly scanning the laser beam on the welding area where the battery case and the sealing cover are to be welded together, the laser beam is irradiated and linearly scanned in a straight-line form from the first position outside the annular shape to the second position located in the annular shape.

5. The method according to claim 4, wherein the first position at which the laser beam is irradiated is on an outer side of the annular shape in plan view.

6. The method according to claim 1, wherein the welding further includes linearly scanning the laser beam from the third position located in the welding area, over another half circumference of the welding area, to the second position located in the welding area such that the battery case and the sealing cover are welded together over an entire circumference of the welding area.

7. The method according to claim 6, wherein the welding area has an annular shape in plan view, and the second position and the fourth position at which the laser beam is irradiated are on an outer side of the annular shape in plan view.

8. The method according to claim 7, wherein the laser beam is linearly scanned in a straight-line form from the fourth position to the third position.

9. The method according to claim 1, wherein a first power density of the first beam set for heat-conduction welding is lower than a second power density of the second beam set for the keyhole welding.

10. The method according to claim 9, wherein in the welding, the second beam with the second power density is irradiated on the welding area, which has been melted by the first beam with the first power density, to weld the battery case and the sealing cover at the welding area by the keyhole welding.

11. The method according to claim 1, wherein in the welding, when the laser beam reaches the second position included in the welding area, the first beam is irradiated at the second position prior to the second beam, and then the second beam starts being irradiated at the second position.

12. A method for producing a sealed battery including: a battery case having a liquid inlet; and a sealing cover that seals the liquid inlet, wherein the method comprises:

injecting an electrolytic solution into the battery case through the liquid inlet; and after the injecting, welding the battery case and the sealing cover by irradiating and linearly scanning a laser beam on a welding area across the battery case and the sealing cover, while the liquid inlet is closed with the sealing cover, the laser beam has a beam profile including:

a first beam capable of vaporizing the electrolytic solution and oil, which exist on a surface of the welding area; and a second beam enabling keyhole welding on a removal portion of the welding area, from which at least part of the electrolytic solution and at least part of the oil have been removed by irradiation of the first beam, and the welding includes:

before irradiating and linearly scanning the laser beam on the welding area where the battery case and the sealing cover are to be welded together, starting irradiating the laser beam from a first position located outside the welding area and linearly scanning the laser beam to a second position included in the welding area, linearly scanning the laser beam from the second position, over a half circumference of the welding area, to a third position located in the welding area, temporarily stopping irradiation of the laser beam at the third position, linearly scanning the laser beam from the third position located in the welding area, over another half circumference of the welding area, to the second position located in the welding area such that the battery case and the sealing cover are welded together over an entire circumference of the welding area, and resuming irradiating the laser beam at a fourth position located outside the welding area and linearly scanning the laser beam from the fourth position to the third position included in the welding area.

* * * * *